Figure 1:
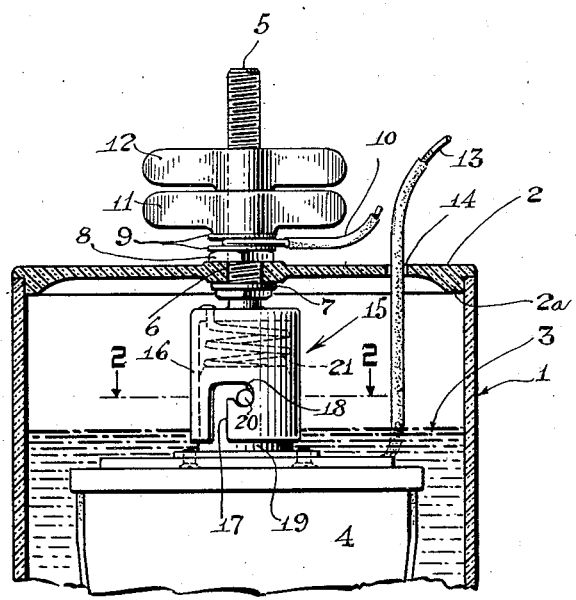

May 11, 1948.  P. A. GARRITY  2,441,481

DETACHABLE ELECTRODE ASSEMBLY FOR PRIMARY CELLS

Filed May 26, 1944

Inventor
Philip A. Garrity
By Henry Lanahan
Attorney

Patented May 11, 1948

2,441,481

UNITED STATES PATENT OFFICE 2,441,481

DETACHABLE ELECTRODE ASSEMBLY FOR PRIMARY CELLS

Philip A. Garrity, Oak Park, Ill., assignor to Thomas A. Edison, Incorporated, West Orange, N. J., a corporation of New Jersey Application May 26, 1944, Serial No. 537,467

3 Claims. (Cl. 136—102)

This invention relates to primary batteries of the type whose electrodes become depleted with use of the battery and are replaced as required to maintain the batteries in working condition.

My invention has particular utility with primary cells of the copper oxide-zinc-alkaline electrolyte type, but is of course not limited thereto. This construction comprises a jar made of porcelain or glass, a flat cover or lid of porcelain having a central hole therein, and an electrode assembly having a long upstanding bolt which is passed through the central hole of the cover and secured thereto so that the electrode assembly is suspended in the jar from the cover in the completed cell.

The bolt abovementioned is utilized also as a terminal for the cell, and the standard practice for connecting the bolt to the cover and making a lead connection to the bolt is as follows: A small hexagonal nut is threaded onto the bolt against the top side of the cover to clamp the bolt in place, a pair of washers is then put on the bolt above the hexagonal nut and a bared end portion of a lead wire is interposed between them, and then a pair of wing nuts is screwed onto the bolt against the washers, the one wing nut serving as a lock nut for the other.

When an electrode assembly is depleted it is removed from the cover and discarded and another is installed in its place, but the same jar, cover, nuts and washers are used again and again with successive new electrode assemblies. To install a new electrode assembly it has accordingly been necessary to remove the wing nuts, washers and hexagonal nut and lay these parts aside as a new electrode assembly is installed on the cover in place of the old, and then to pick up these parts in their proper order and put them back onto the extending length of bolt. This is of course a very tedious procedure, and makes the job of replacing the electrode assemblies in a large battery installation a very burdensome and time-consuming one.

It is an object of my invention to enable present owners of these cells to continue to secure the bolt to the cover and to make the lead connection to the extending length of bolt in the manner in which they are long accustomed, and with the same parts which they now have on hand, but to eliminate the many tedious operations in having to remove these parts upon installing each new electrode assembly.

Further, it is an object to enable users to replace electrode assemblies without the necessity of breaking any lead connection to the terminal post, and without having to remove any permanent parts which later have to be put back in place.

A further object is to provide an improved primary cell construction including a combined mechanical and electrical coupling which is adapted to securely hold the assembly to the cover and make a permanent lead connection to the bolt but which is readily detachable by a single manipulation of the hand to permit easy installation of a new electrode assembly.

Figure 2:
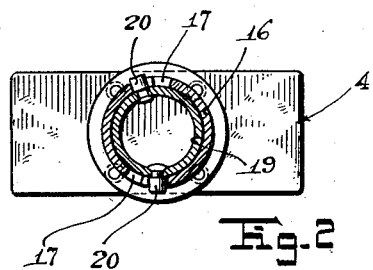

These and other objects of my invention are accomplished by a simple mechanical addition to a standard construction of primary cell, as will be apparent by the following description, reference being had to the accompanying drawings, of which:

Figure 1 is a view of a primary cell, showing the cell container in vertical section, into which an embodiment of my invention is incorporated; and Figure 2 is a fractional sectional view taken on the line 2—2 of Figure 1.

In Figure 1 there is shown a conventional primary battery comprising a jar 1, fractionally shown, which is made typically of glass or porcelain and on the top of which there is a lid or cover 2 typically also made of glass or porcelain, the cover having an annular shoulder 2a depending therefrom which engages the rim of the jar to hold the cover in place. The jar contains a liquid electrolyte and has an electrode plate assembly 4 suspended from the cover and immersed in the electrolyte. Typically, for the type of cell abovementioned, the electrolyte 3 comprises a solution of caustic soda and the plate assembly comprises a group of alternate copper oxide and zinc plates. It will be understood that these plates are held mechanically together into a unitary structure and that adjacent plates are spaced and insulated from each other but that alternate plates of respective polarity are electrically interconnected. This assembly forms, however, no part of my invention and is accordingly herein diagrammatically shown. For a detailed description of the construction and arrangement of a suitable plate assembly of the type abovementioned, reference may be had to Eddy Patent No. 2,175,885.

The electrode assembly is connected to and suspended from the cover 2. The means by which this connection is made comprises a bolt 5 which passes through a central hole 6 in the cover, the bolt having a bottom shoulder 7 held tightly against the bottom side of the cover by a nut 8 which is threaded onto the upwardly-extending length of the bolt. The bolt serves also as a terminal for the electrodes of one polarity of the electrode assembly. The means for making a lead connection to the bolt comprises a pair of washers 9 on the nut 8 between which the bared end portion of a lead wire 10 is inserted, a wing nut 11 threaded on the bolt for clamping the washers against the lead wire and a second wing nut 12 which serves as a lock nut for the first. Electrical connection to the electrodes of the other polarity of the electrode assembly is made by a lead wire 13 which passes out through a small hole 14 in the cover.

All of the exterior parts above described for holding the electrode assembly to the cover and for fastening the lead wire 10 to the bolt have long been used in the art. However, it has been standard practice to secure the electrode assembly permanently to the bolt. Thus, when an electrode assembly has become depleted and is to be replaced by a new assembly, it has been necessary to remove the nuts 8, 11 and 12 and the washers 9 from the long extending length of the bolt 5, to break the lead connection of the wire 10 with the bolt, and after installing a new electrode assembly to put back the nuts and washers on the bolt in their proper order and to reconnect the lead wire.

By my invention these many tedious manipulations heretofore required in replacing an electrode assembly are mainly avoided. This is accomplished by providing a disengageable connector device 15 between the electrode assembly 4 and bolt 5 which will securely hold the assembly to the cover while permitting ready and easy detachment, and at the same time afford a detachable circuit connection to the bolt 5. Also, it will be observed that this connector device is engageable in only one position so as to assure a proper positioning of the electrode assembly relative to the cover.

By way of illustration, the connector device 15 may comprise a cup 16 fixedly secured to the bottom portion of the bolt 5 below the cover and having preferably a plurality (two being shown) of open-ended slots 17 which extend upwardly from the bottom end thereof and then crosswise to terminate into notches 18. On the top of the electrode assembly there is fixedly secured a short cylindrical metal post 19 which is electrically connected to the electrodes of one polarity of the electrode assembly in any suitable way such as is illustrated by the aforementioned Eddy patent. This post 19 fits snugly into, or is telescoped with, the cup 16 and has two radially-projecting pins 20 for engagement with the slots 17. To interlockingly connect the electrode assembly to the cover, the post is inserted into the cup with the pins being aligned with and passing into the slots, and the electrode assembly is then turned about the axis of the post and cup—that is, in its broader aspects, is moved in directions substantially parallel to the bottom face of the cover—so as to bring the pins into engagement with the notches. Within the cup there is provided a compression spring 21 which resists insertion of the post into the cup, but which holds the pins solidly in engagement with the notches when the post and cup are interlockingly engaged. This spring, being made of conductive material as is next explained, also serves to provide a positive electrical connection between the electrode assembly and the bolt when the connector device is engaged.

The different parts of the present illustrative embodiment are desirably made of suitable conductive materials which may for example be of steel when a caustic alkali electrolyte is used as abovementioned. The bolt 5, cup 16 and spring 21, being permanent parts which are used again and again with successive electrode assemblies, are however made of a grade of steel which is highly non-rusting and caustic-resisting such as stainless steel, but the post 19 and pins 20 may be made of ordinary steel.

To detach the electrode assembly, it is first moved slightly toward the cover against the resisting force of the spring 21 and is then turned relative to the cover and withdrawn therefrom. It will be observed that attachment of the electrode assembly to the cover and detachment therefrom is performed by a single manipulation of the hand, and that simultaneously therewith the electrical connection of the electrode assembly to the bolt is respectively automatically made and broken.

Preferably, the slots 17 and pins 20 are non-symmetrically positioned about the axis of the cup 16 and post 19, being separated for example by an interval of about 170°, so that the electrode assembly 4 can be attached to the cover in only one position relative thereto. This, among other things, has the advantage of placing the lead wire 13 at the proper place for passing out through the hole 14 of the cover 2.

The embodiment herein disclosed will be understood to be illustrative and not limitative of my invention, and to be subject to many changes and modifications without departure from the scope of my invention, which I endeavor to express according to the following claims.

I claim:

1. In a primary cell having a container for electrolyte, a cover for said container provided with an electrical terminal, and a replaceable electrode assembly adapted to be suspended in the container from the cover: a device for detachably securing said electrode assembly to said cover and for electrically connecting an electrode of one polarity of said assembly to said terminal, comprising a pair of telescoping means one of which is secured to said electrode assembly and electrically connected to said one electrode thereof and the other of which is secured to said cover and electrically connected to said terminal, one of said means having slots and the other having corresponding pins for interlocking engagement of one means with the other, said pins and slots being non-symmetrically disposed about the axis of said telescoping means whereby said assembly is connectable to said cover in only one position relative thereto.

2. In a primary galvanic cell including a container, a cover plate for said container, and an electrode assembly: a device for detachably connecting said electrode assembly to said cover plate comprising a first coupling member rigidly secured to said cover plate and adapted to serve as an electrical terminal for said electrode assembly, said coupling member having a part depending below said cover plate, a second coupling member secured to said electrode assembly and having an upstanding part adapted to telescope with said depending part of said first coupling member in directions at right angles to said cover plate, one of said coupling parts having a slot in the wall thereof of which at least an inner portion of said slot is transverse to the direction of the telescoping of said parts, a cross pin in the other of said parts for engaging said slot and detachably securing said electrode assembly to said cover plate upon telescopingly engaging said parts and then moving said second coupling member relative to said first coupling member in directions substantially parallel to said cover plate, and spring means associated with one of said coupling members and engaging the other of said members when the same are interlocked together for releasably retaining said coupling members in interlocked relationship.

3. In a primary galvanic cell including a container, a cover plate for said container, and an electrode assembly: a device for detachably connecting said electrode assembly to said cover plate comprising a first coupling member rigidly secured to said cover plate and adapted to serve as an electrical terminal for said electrode assembly, said coupling member having a part depending below said cover plate, a second coupling member secured to said electrode assembly and having an upstanding part adapted to telescope with said depending part of said first coupling member in directions at right angles to said cover plate, one of said parts being tubular and the other of said parts being adapted to telescope with said tubular part, said tubular part having an open-ended slot running lengthwise thereof and terminating in a transversely-extending inner portion, and a cross pin in the other of said parts for engaging said slot and interlocking said coupling members together upon turning said second coupling member relative to said first coupling member about the axis of their telescoping engagement while the same are in telescoping relationship, and a spring interposed between said coupling members for releasably retaining the same in interlocked relationship.

PHILIP A. GARRITY.

REFERENCES CITED

The following references are of record in the file of this patent:

UNITED STATES PATENTS

| Number | Name | Date |
| --- | --- | --- |
| 19,759 | Doyle | Mar. 30, 1858 |
| 496,878 | Holtzer | May 9, 1893 |
| 744,989 | Winters | Nov. 24, 1903 |
| 779,693 | DeLavie | Jan. 10, 1905 |
| 1,676,945 | Ellis | July 10, 1928 |
| 1,776,552 | Dunzweiler | Sept. 23, 1930 |

FOREIGN PATENTS

| Number | Country | Date |
| --- | --- | --- |
| 223,487 | Great Britain | Oct. 23, 1924 |
| 262,814 | Great Britain | Feb. 9, 1928 |
| 619,671 | France | Jan. 5, 1927 |
| 666,583 | Germany | Sept. 1, 1939 |